(12) United States Patent
Bunton et al.

(10) Patent No.: US 7,197,100 B2
(45) Date of Patent: Mar. 27, 2007

(54) HIGH-SPEED INTERCONNECTION ADAPTER HAVING AUTOMATED LANE DE-SKEW

(75) Inventors: William P. Bunton, Pflugerville, TX (US); John Krause, Georgetown, TX (US); Scott Smith, Taylor, TX (US); Patricia L. Whiteside, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 741 days.

(21) Appl. No.: 10/680,913

(22) Filed: Oct. 8, 2003

(65) Prior Publication Data
US 2004/0071250 A1    Apr. 15, 2004

Related U.S. Application Data

(63) Continuation of application No. 09/596,980, filed on Jun. 20, 2000, now Pat. No. 6,690,757.

(51) Int. Cl.
*H04L 25/00* (2006.01)
*H04L 7/00* (2006.01)

(52) U.S. Cl. ............... 375/372; 375/369; 375/373; 370/503; 711/116; 711/169

(58) Field of Classification Search ............. 375/372, 375/369, 373, 376, 220, 226; 370/503, 515; 711/116, 169
See application file for complete search history.

(56) References Cited

U.S. PATENT DOCUMENTS

| | | | |
|---|---|---|---|
| 4,907,186 A * | 3/1990 | Racey ................... 710/57 |
| 4,984,251 A | 1/1991 | Perloff et al. |
| 5,020,023 A | 5/1991 | Smith |
| 5,835,498 A | 11/1998 | Kim et al. |
| 5,920,897 A * | 7/1999 | Jin et al. ................ 711/167 |
| 5,978,891 A * | 11/1999 | Takeda ................... 711/167 |
| 6,385,671 B1 | 5/2002 | Hunsaker et al. |
| 6,459,746 B2 | 10/2002 | Agazzi et al. |
| 6,466,221 B1 * | 10/2002 | Satoh et al. ............. 345/556 |
| 6,512,804 B1 | 1/2003 | Johnson et al. |
| 6,690,757 B1 * | 2/2004 | Bunton et al. ........... 375/371 |
| 6,853,696 B1 * | 2/2005 | Moser et al. ............ 375/375 |
| 2002/0018444 A1 * | 2/2002 | Cremin et al. .......... 370/235 |
| 2002/0056021 A1 * | 5/2002 | Manning ................. 711/105 |

\* cited by examiner

*Primary Examiner*—Jay K. Patel
*Assistant Examiner*—Qutub Ghulamali (57) ABSTRACT

An adapter that buffers received symbols and automatically determines and corrects for skew between lanes is disclosed. In one embodiment, the adapter is a part of a network that includes a first and second devices coupled together by a communications link having multiple independent serial lanes. The first device initiates communication by repeatedly transmitting a training sequence that includes a start symbol for each lane. An adapter in the second device includes a set of buffers each configured to receive the symbols conveyed by a corresponding serial lane. The buffers are coupled to a reconstruction circuit that removes one "symbol group" at a time from the buffers. A symbol group is made up of one symbol from each buffer. The reconstruction circuit removes symbol groups until a start symbol is detected. If the start symbol is not detected in all buffers, output from the buffers having start symbols is temporarily suspended.

16 Claims, 9 Drawing Sheets

TRAINING SET 1 (TS1)

| COM LANE 0 | COM LANE 1 | COM LANE 2 | COM LANE 3 |
|---|---|---|---|
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |

TRAINING SET 2 (TS2)

| COM LANE 0 | COM LANE 1 | COM LANE 2 | COM LANE 3 |
|---|---|---|---|
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |

FIG. 5

Physical Link Lane Identifiers

| LANE IDENTIFIER | 8B/10B CODE NAME | NEGATIVE RD | POSITIVE RD |
|---|---|---|---|
| LID 0 | D0.0 | 10011 10100 | 01100 01011 |
| LID 1 | D1.0 | 01110 10100 | 10001 01011 |
| LID 2 | D2.0 | 10110 10100 | 01001 01011 |
| LID 3 | D4.0 | 11010 10100 | 00101 01011 |
| LID 4 | D8.0 | 11100 10100 | 00011 01011 |
| LID 5 | D15.0 | 01011 10100 | 10100 01011 |
| LID 6 | D16.0 | 01101 10100 | 10010 01011 |
| LID 7 | D23.0 | 11101 00100 | 00010 11011 |
| LID 8 | D24.0 | 11001 10100 | 00110 01011 |
| LID 9 | D27.0 | 11011 00100 | 00100 11011 |
| LID 10 | D29.0 | 10111 00100 | 01000 11011 |
| LID 11 | D30.0 | 01111 00100 | 10000 11011 |

HIGH-SPEED INTERCONNECTION ADAPTER HAVING AUTOMATED LANE DE-SKEW

CROSS-REFERENCE TO RELATED APPLICATIONS

This application is a continuation of U.S. application Ser. No. 09/596,980, filed Jun. 20, 2000, now U.S. Pat. No. 6,690,757 and entitled "High-Speed Interconnection Adapter Having Automated Client Lane De-Skew.

STATEMENT REGARDING FEDERALLY SPONSORED RESEARCH OR DEVELOPMENT

Not applicable.

BACKGROUND OF THE INVENTION

1. Field of the Invention

The present invention generally relates to high bandwidth interconnections for use in networking environments such as local area networks (LAN), wide area networks (WAN) and storage area networks (SAN). More specifically, it relates to a method of correcting skew in signals resulting from different paths lengths and obstructions in multiple, parallel signal carriers.

2. Description of Related Art

Internet and electronic commerce has grown to the point where demands placed on existing computer systems are severely testing the limits of system capacities. Microprocessor and peripheral device performances have improved to keep pace with emerging business and educational needs. For example, internal clock frequencies of microprocessors have increased dramatically, from less than 100 MHz to more than 1 GHz over a span of less than ten years. Where this performance increase in inadequate, high performance systems have been designed with multiple processors and clustered architecture. It is now commonplace for data and software applications to be distributed across clustered servers and separate networks. The demands created by these growing networks and increasing speeds are straining the capabilities of existing Input/Output (I/O) architecture.

Peripheral Component Interconnect (PCI), released in 1992, is perhaps the most widely used I/O technology today. PCI is a shared bus-based I/O architecture and is commonly applied as a means of coupling a host computer bus (front side bus) to various peripheral devices in the system. Publications that describe the PCI bus include the *PCI Specification, Rev. 2.2*, and *Power Management Specification 1.1*, all published by the PCI Special Interest Group. The principles taught in these documents are well known to those of ordinary skill in the art and are hereby incorporated herein by reference.

At the time of its inception, the total raw bandwidth of 133 MBps (32 bit, 33 MHz) provided by PCI was more than sufficient to sustain the existing hardware. Today, in addition to microprocessor and peripheral advancements, other I/O architectures such as Gigabit Ethernet, Fibre Channel, and Ultra3 SCSI are outperforming the PCI bus. Front side buses, which connect computer microprocessors to memory, are approaching 1–2 GBps bandwidths. It is apparent that the conventional PCI bus architecture is not keeping pace with the improvements of the surrounding hardware. The PCI bus is quickly becoming the bottleneck in computer networks.

In an effort to meet the increasing needs for I/O interconnect performance, a special workgroup led by Compaq Computer Corporation developed PCI-X as an enhancement over PCI. The PCI-X protocol enables 64-bit, 133 MHz performance for a total raw bandwidth that exceeds 1 GBps. While this is indeed an improvement over the existing PCI standard, it is expected that the PCI-X bus architecture will only satisfy I/O performance demands for another two or three years.

In addition to the sheer bandwidth limitations of the PCI bus, the shared parallel bus architecture used in PCI creates other limitations which affect its performance. Since the PCI bus is shared, there is a constant battle for resources between processors, memory, and peripheral devices. Devices must gain control of the PCI bus before any data transfer to and from that device can occur. Furthermore, to maintain signal integrity on a shared bus, bus lengths and clock rates must be kept down. Both of these requirements are counter to the fact that microprocessor speeds are going up and more and more peripheral components are being added to today's computer systems and networks.

Today, system vendors are decreasing distances between processors, memory controllers and memory to allow for increasing clock speeds on front end buses. The resulting microprocessor-memory complex is becoming an island unto itself. At the same time, there is a trend to move the huge amounts of data used in today's business place to storage locations external to network computers and servers. This segregation between processors and data storage has necessitated a transition to external I/O solutions.

One solution to this I/O problem has been proposed by the Infiniband(SM) Trade Association. The Infiniband(SM) Trade Association is an independent industry body that is developing a channel-based, switched-network-topology interconnect standard. This standard will de-couple the I/O subsystem from the microprocessor-memory complex by using I/O engines referred to as channels. These channels implement switched, point to point serial connections rather than the shared, load and store architecture used in parallel bus PCI connections.

The Infiniband interconnect standard offers several advantages. First, it uses a differential pair of serial signal carriers, which drastically reduces conductor count. Second, it has a switched topology that permits many more nodes which can be placed farther apart than a parallel bus. Since more nodes can be added, the interconnect network becomes more scalable than the parallel bus network. Furthermore, as new devices are added, the links connecting devices will fully support additional bandwidth. This Infiniband architecture will let network managers buy network systems in pieces, linking components together using long serial cables. As demands grow, the system can grow with those needs.

The trend towards using serial interconnections as a feasible solution to external I/O solutions is further evidenced by the emergence of the IEEE 1394 bus and Universal Serial Bus (USB) standards. USB ports, which allow users to add peripherals ranging from keyboards to biometrics units, have become a common feature in desktop and portable computer systems. USB is currently capable of up to 12 MBps bandwidths, while the IEEE 1394 bus is capable of up to 400 MBps speeds. A new version of the IEEE 1394 bus (IEEE 1394b) can support bandwidth in excess of 1 GBps.

Maintaining signal integrity is extremely important to minimize bit error rates (BER). At these kinds of bandwidths and transmission speeds, a host of complications which affect signal integrity may arise in the physical layer of a network protocol. The physical layer of a network protocol involves the actual media used to transmit the digital signals. For Infiniband, the physical media may be a twisted pair copper cable, a fiber optic cable, or a copper backplane. Interconnections using copper often carry the transmitted signals on one or more pairs of conductors or traces on a printed circuit board. Each optical fiber or differential conductor pair is hereafter called a "lane".

Where multiple lanes are used to transmit serial binary signals, examples of potential problems include the reordering of the lanes and skew. Skew results from different lane lengths or impedances. Skew must be corrected so that data that is transmitted at the same time across several lanes will arrive at the receiver at the same time. Lane reordering must be corrected so a digital signal may be reconstructed and decoded correctly at the receiver end.

Even in the simplest case involving a single differential wire pair, a potential problem exists in the routing of the differential wire pair. It is possible for wires to be crossed either inadvertently, as in a cable miswire, or intentionally, as may be necessary to minimize skew. In transmitting digital signals via a differential wire pair, one wire serves as a reference signal while the other wire transmits the binary signal. If the wire terminations are incorrect, the binary signal will be inverted.

Conventional correction and prevention of these types of problems has been implemented with the meticulous planning and design of signal paths. Differential wire pairs are typically incorporated into cables as twisted wire pairs of equal lengths. However, matched delay or matched length cabling is more expensive because of the manufacturing precision required. In backplane designs, trace lengths may vary because of board congestion, wire terminations and connector geometries. Shorter traces are often lengthened using intentional meandering when possible to correct for delay caused by other components. It is often impractical to correct crossed differential pairs because one trace passes through two vias to "cross under" the other trace. The vias introduce a substantial time delay, thereby causing data skew. Alternatively, the differential pairs are left uncorrected and the data inversion is accounted for using pin straps or boundary scan techniques. Both of these fixes require intervention by the system designer. These techniques have also been used to correct lane reversal.

The physical layer in Infiniband carries signals encoded by a digital transmission code called "8B/10B". 8B/10B is an encoding/decoding scheme which converts an 8-bit word (i.e., a byte) at the link layer of the transport protocol to a 10-bit word that is transmitted in the physical layer of the same protocol.

The 8B/10B code is a "zero-DC" code, which provides some advantages for fiber optic and copper wire links. Transmitter level, receiver gain, and equalization are simplified and their precision is improved if the signals have a constant average power and no DC component. Simply stated, in converting an 8-bit word to a 10-bit word, the encoder selects the 10-bit representation based on the sign of the running disparity of the digital signal. Running disparity refers to a running tally of the difference between the number of 1 and 0 bits in a binary sequence. If the running disparity is negative (implying that more 0 bits have been transmitted than 1 bits), the subsequent 8B/10B word will contain more 1 bits than 0 bits to compensate for the negative running disparity. In the 8B/10B code, every 8-bit word has two 10-bit equivalent words. The 10 bit equivalent words will have five or more 1 bits for a negative running disparity and five or more 0 bits for a positive running disparity. For a more detailed description of the 8B10B code, refer to Widmer and Franaszek, "A DC-Balanced, Partitioned-Block, 8B/10B Transmission Code", IBM J. Res. Develop., Vol. 27, No. 5, September 1983, which is hereby incorporated by reference.

The above design considerations clearly make physical layer (i.e., cables, backplanes) manufacturing a difficult venture in high clock frequency systems. Design costs and manufacturing costs are drastically increased due to the need to alleviate these types of problems. It is desirable, therefore, to provide a method of automatically correcting these types of errors with information embedded in the signals. It is further desirable to develop a method of automatically detecting and correcting signal skew to coordinate synchronous arrival of signals across multi-lane serial links. This method of correction may advantageously allow for less stringent design requirements and could decrease design and manufacturing costs for high bandwidth data links.

BRIEF SUMMARY OF THE INVENTION

The problems noted above are solved in large part by an adapter that buffers received symbols and automatically determines and corrects for skew between lanes. In one embodiment, the adapter is a part of a network that includes a first and second devices coupled together by a communications link having multiple independent serial lanes. The first device initiates communication by repeatedly transmitting a training sequence that includes a start symbol for each lane. An adapter in the second device includes a set of buffers each configured to receive the symbols conveyed by a corresponding serial lane. The buffers are coupled to a reconstruction circuit that removes one "symbol group" at a time from the buffers. A symbol group is made up of one symbol from each buffer. The reconstruction circuit removes symbol groups until a start symbol is detected. If the start symbol is not detected in all buffers, output from the buffers having start symbols is temporarily suspended. Symbol removal from the other buffers continues until start symbols are detected, or until a limit is reached. If start symbols are detected in all buffers, the suspension is lifted, and symbol group retrieval resumes with skew having been eliminated. Otherwise, if the limit is reached, the buffers are cleared and the process is retried from the beginning.

Once the skew is eliminated, the reconstruction circuit combines the symbol groups to form an output symbol sequence. Symbol groups used for demarcation (such as the start symbols) or filler (skip symbols) may be discarded by the reconstruction circuit. The symbols are preferably eight-bit bytes.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
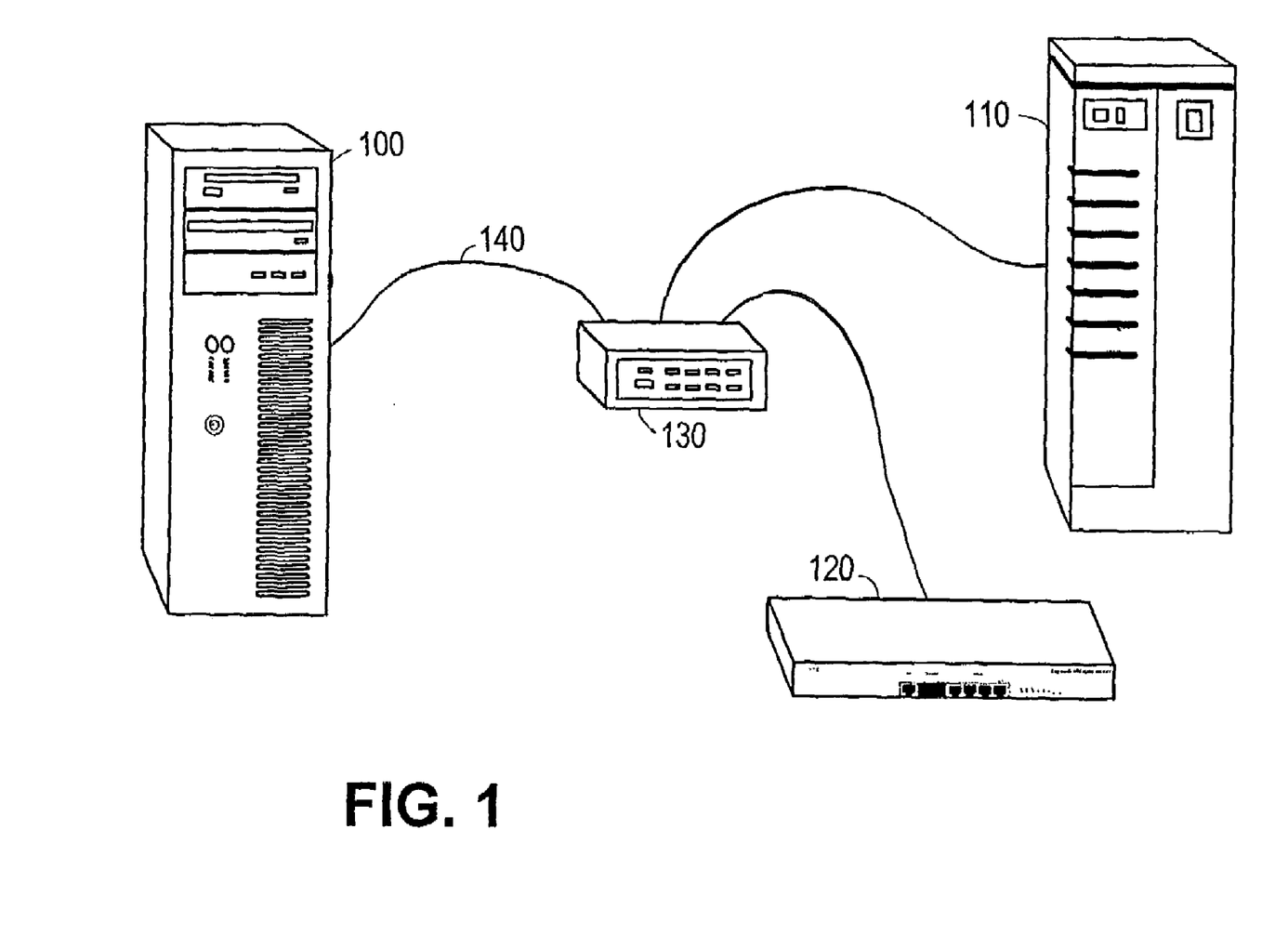
FIG. 1 shows an illustrative diagram of a simple computer network which supports serial I/O connections.

FIG. 1 shows an example of a computer network representing a preferred embodiment, in which a central computer 100 is coupled to an external storage tower 110 and a network router 120 via a multiservice switch 130. Storage tower 110 may be internally connected by a Fibre Channel, SCSI, or any suitable storage network. Network router may be connected to a LAN (local area network) or ISDN (Integrated Services Digital Network) network or it may provide a connection to the internet via a suitable ATM (asynchronous transfer mode) network. It should be appreciated that any number of computers, servers, switches, hubs, routers, or any suitable network device can be coupled to the network shown in FIG. 1.

In the preferred embodiment shown in FIG. 1, the devices are connected via a point to point serial link 140. The serial link may comprise an even number of lanes or channels through which data is transmitted. Of the even number of lanes, half will transmit serial data in one direction while the other half transmits data in the opposite direction. In the preferred embodiment, the physical links will implement 1, 4, or 12 lanes in each direction. Thus, each link will have a total of 2, 8, or 24 total lanes.

In the latter two implementations (i.e., the 4 and 12 lane links), a single stream of bytes arriving at the input to the physical link are distributed evenly, or "striped", among the multiple lanes. In the case of the 12-lane link, the first byte is sent to the first lane, the second byte is sent to the second lane and so on until the $12^{th}$ byte is sent to the $12^{th}$ lane. At that point, the byte distribution cycles back to the first lane and the process continues. Thus, over time, each lane will carry an equal $\frac{1}{12}^{th}$ share of the bandwidth that the entire link carries. The same process and technique are used in the 4 lane link. Alternative embodiments with different numbers of lanes would preferably implement this striping process.

Once the bytes are distributed among the individual lanes, the 8-bit words are encoded into 10-bit words and transmitted through the physical link. At the output of the physical link, the 10-bit words are decoded back to 8-bit bytes and are re-ordered to form the original stream of 8-bit words.

Since the words arriving from each lane in the link are stacked to recreate the single word stream, it is imperative that the words arrive in the same sequence that they were sent. The training method described below compensates for any skew in individual lanes and corrects any discrepancies to guarantee synchronous arrival times.

Figure 2:
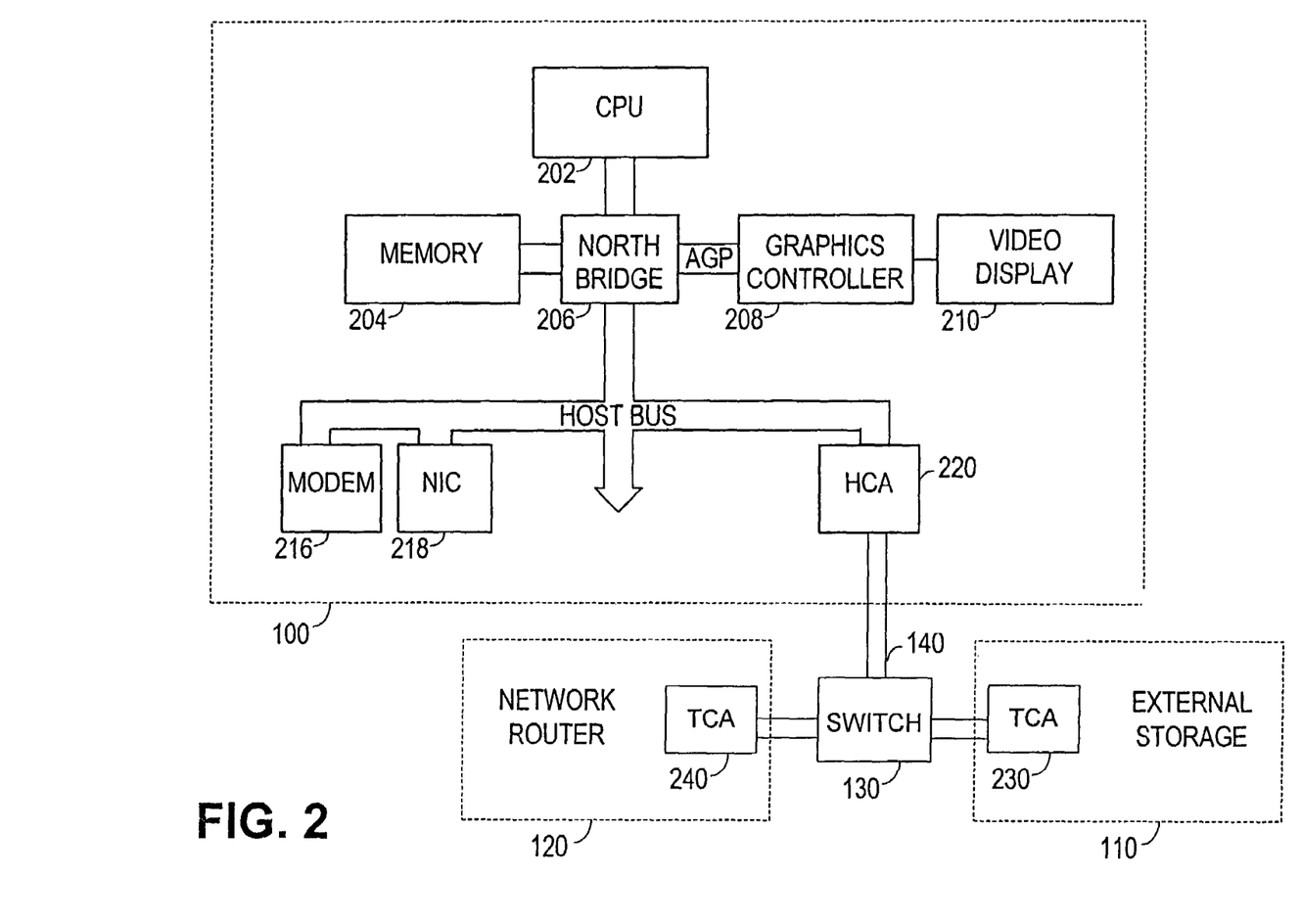
FIG. 2 shows a functional block diagram of a simple computer network which supports serial I/O connections.

FIG. 2 represents a functional block diagram of the computer network shown in FIG. 1. The computer 100 generally includes a central processor unit (CPU) 202, a main memory array 204, and a bridge logic device 206 coupling the CPU 202 to the main memory 204. The bridge logic device is sometimes referred to as a "North bridge" for no other reason than it often is depicted at the upper end of a computer system drawing. The North bridge 206 couples the CPU 202 and memory 204 to various peripheral devices in the system through a primary expansion bus (Host Bus) such as a Peripheral Component Interconnect (PCI) bus or some other suitable architecture.

The North bridge logic 206 also may provide an interface to an Accelerated Graphics Port (AGP) bus that supports a graphics controller 208 for driving the video display 210. If the computer system 100 does not include an AGP bus, the graphics controller 208 may reside on the host bus.

Various peripheral devices that implement the host bus protocol may reside on the host bus. For example, a modem 216, and network interface card (NIC) 218 are shown coupled to the host bus in FIG. 2. The modem 216 generally allows the computer to communicate with other computers or facsimile machines over a telephone line, an Integrated Services Digital Network (ISDN), or a cable television connection, and the NIC 218 permits communication between computers over a local area network (LAN) (e.g., an Ethernet network card or a Cardbus card). These components may be integrated into the motherboard or they may be plugged into expansion slots that are connected to the host bus.

FIG. 2 also depicts a host channel adapter (HCA) 220 connected to the host bus and target channel adapters (TCA) 230, 240 connected to the external network devices 110, 120. These channel adapters generally provide address and translation capability for the switched topology architecture in the preferred embodiment. The channel adapters 220, 230, 240 preferably have dedicated IPv6 (Internet Protocol Version 6) addresses that can be recognized by the network switch 130. As data is transmitted to the network, the source file is divided into packets of an efficient size for routing. Each of these packets is separately numbered and includes the address of the destination. When the packets have all arrived, they are reassembled into the original file. The network switch 130 in this preferred embodiment can detect the destination address, and route the data to the proper location.

FIG. 2 also shows the physical links 140 between the network devices as simple two lane links. In the embodiment shown in FIG. 2, data would flow through one lane in one direction while data would flow through the parallel lane the other direction. As discussed above, alternative embodiments comprising any even number of lanes are also permissible, with 2, 8, and 24 lanes per link being the preferred number.

Figure 3:
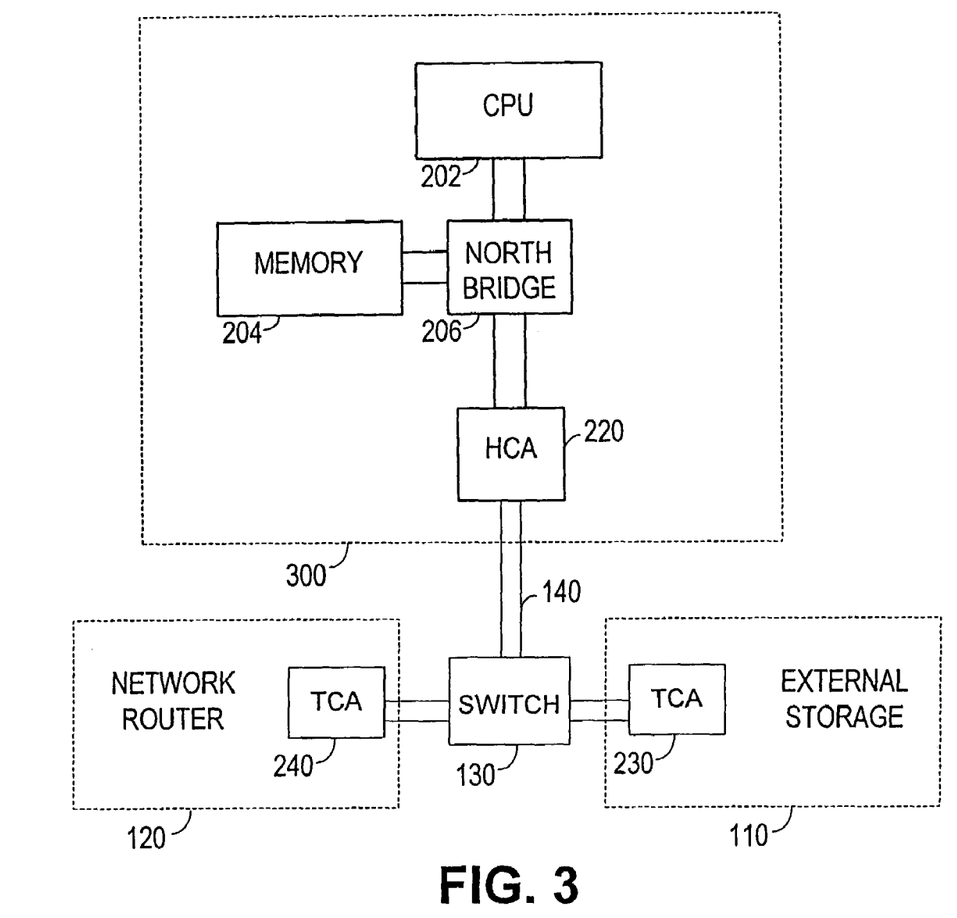
FIG. 3 shows a functional block diagram of an alternative computer network which supports serial I/O connections.

FIG. 3 shows an alternative embodiment of the computer network in which the computer 100 is replaced by a server 300 with a simple memory-processor architecture. Such a server may be part of a cluster of servers, a group of several servers that share work and may be able to back each other up if one server fails. In this particular embodiment, the server 300 is coupled to the switched-fabric network in much the same way the computer 100 of FIG. 1 is connected. The physical link 140 is connected to the server via a host channel adapter (HCA) 220. However, in this embodiment, the HCA 220 is connected directly to a North Bridge 206. Alternatively, the HCA 220 may be connected directly to a memory controller. In either event, a shared peripheral bus, such as a PCI bus, is not necessary in this embodiment. A peripheral bus may still be used in the server 300, but is preferably not used to couple the north bridge 206 to the HCA 220.

As discussed above, the serial data sent through the physical links is sent in the form of packets. The preferred embodiment uses the idea of packetized data and uses specialized packets called Training Set 1 and Training Set 2 to train the network devices prior to transmitting "real" data through the switched network. The actual content and structure of the training sets are discussed in further detail below.

Figure 4:
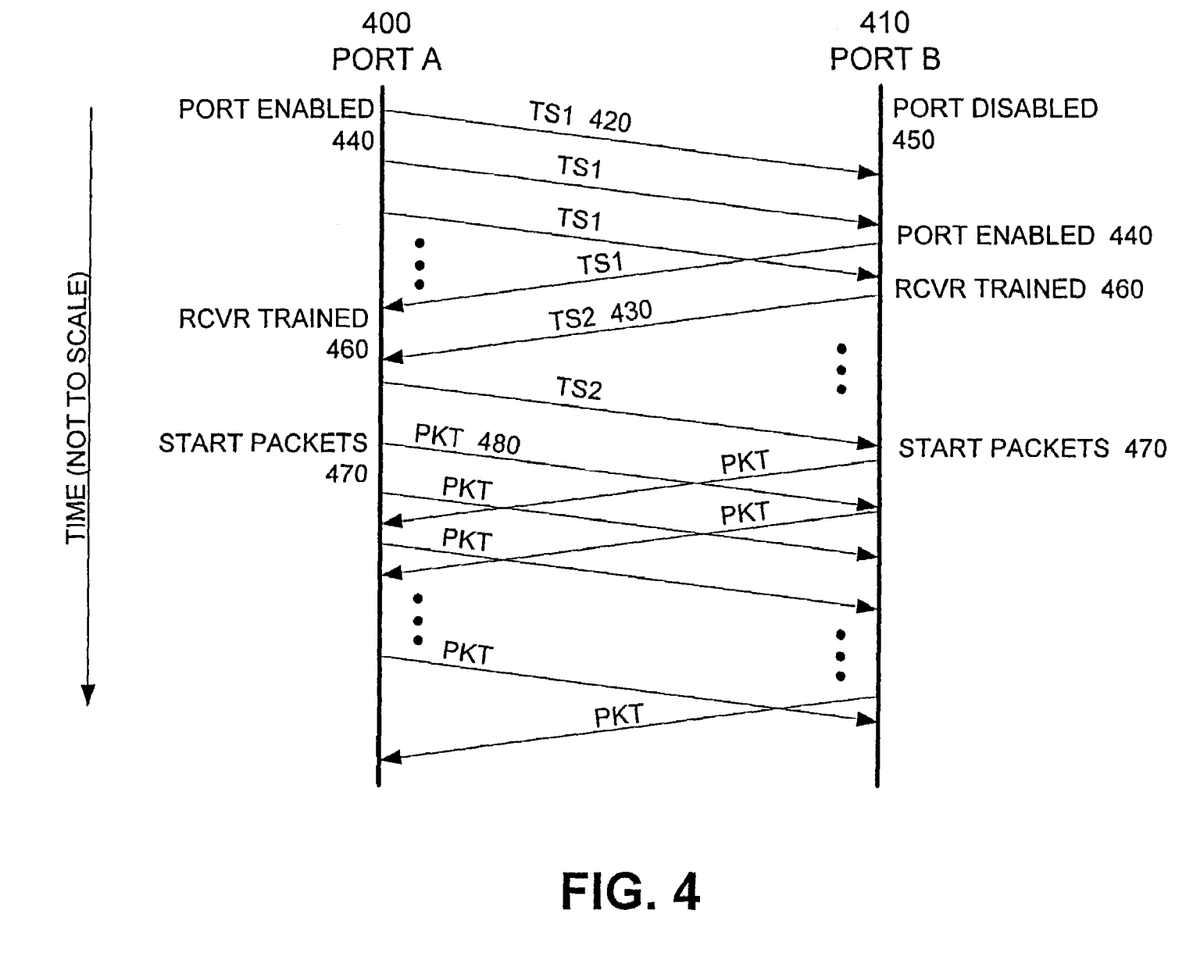
FIG. 4 shows a ladder diagram of the training sequence used to train ports that are coupled to opposite ends of a serial physical link.

FIG. 4 shows a link training ladder diagram describing the sequence of events during the training of ports located on either side of the physical link. In the preferred embodiment, a port refers to a transmitting and receiving device configured with a channel adapter to communicate via a serial link. In FIG. 4, Port A 400 refers to one such device while Port B 410 refers to the device at the other end of the serial link.

The training data, TS1 420 and TS2 430 are packets of known data that are transmitted between Port A 400 and Port B 410. The purpose behind the training sets are twofold. First, the initiation and duration of the training sequence is established by the transmission and reception of the training sets. Secondly, given that the training sets contain predetermined data, the transmit and receive ports can use this knowledge to correct for any errors (e.g., data inversion, lane skew) that may result during transmission through the physical link. Since the errors are a constant, permanent result of routing in the physical media, the training sequence may be used to automatically correct the errors for all subsequent data transferred through that physical link.

FIG. 4 represents a time line for both Port A 400 and Port B 410 with time elapsing toward the bottom of the figure. Before training begins, Port A 400 may exist in an enabled state 440 while Port B is in a disabled or link down state 450. By transmitting an initial sequence of TS1 training sets 420, Port A 400 can effectively wake up Port B 410 from a disabled state to an enabled state 440. Once Port B is enabled 440, two things occur. First, Port B 410 will begin transmitting TS1 training sets back to Port A 400. Secondly, Port B 410 will check the content of the incoming TS1 training sets 420 to see if the data was received as it was sent. If there is any discrepancy, Port B 410 will correct the incoming signals so that the original content of TS1 420 is restored. At this point, Port B 410 will be trained 460 and will respond by sending the second training set, TS2 430, back to Port A 400.

Meanwhile, Port A 400 has been receiving TS1 data 420 from Port B 410 and performs the same signal integrity checks and correction that Port B has completed. Once both ports are trained with TS1 data 420, the ports will proceed by sending TS2 training data 430. This second training set serves as a redundancy check to verify that the Ports were trained properly with TS1 data 420. In addition, the TS2 data 430 signifies that both ports are trained and are ready to transmit and receive data packets 470. Once a port is transmitting and receiving the TS2 training sequence, it may begin sending data. With physical link errors corrected by the training sequences, the data packets 480 can then transmitted and received by the ports as intended.

In the event the training sequence fails, a timeout may occur and the affected port may be powered down or otherwise deactivated. Thus, when a transmission fault occurs, locating the problems in the physical link is facilitated by determining which port has been deactivated. By comparison, failure isolation in a bus architecture can be difficult because if one attached device fails, the entire system may fail. Discovering which device caused the failure is typically a hit-or-miss proposition.

Figure 5:
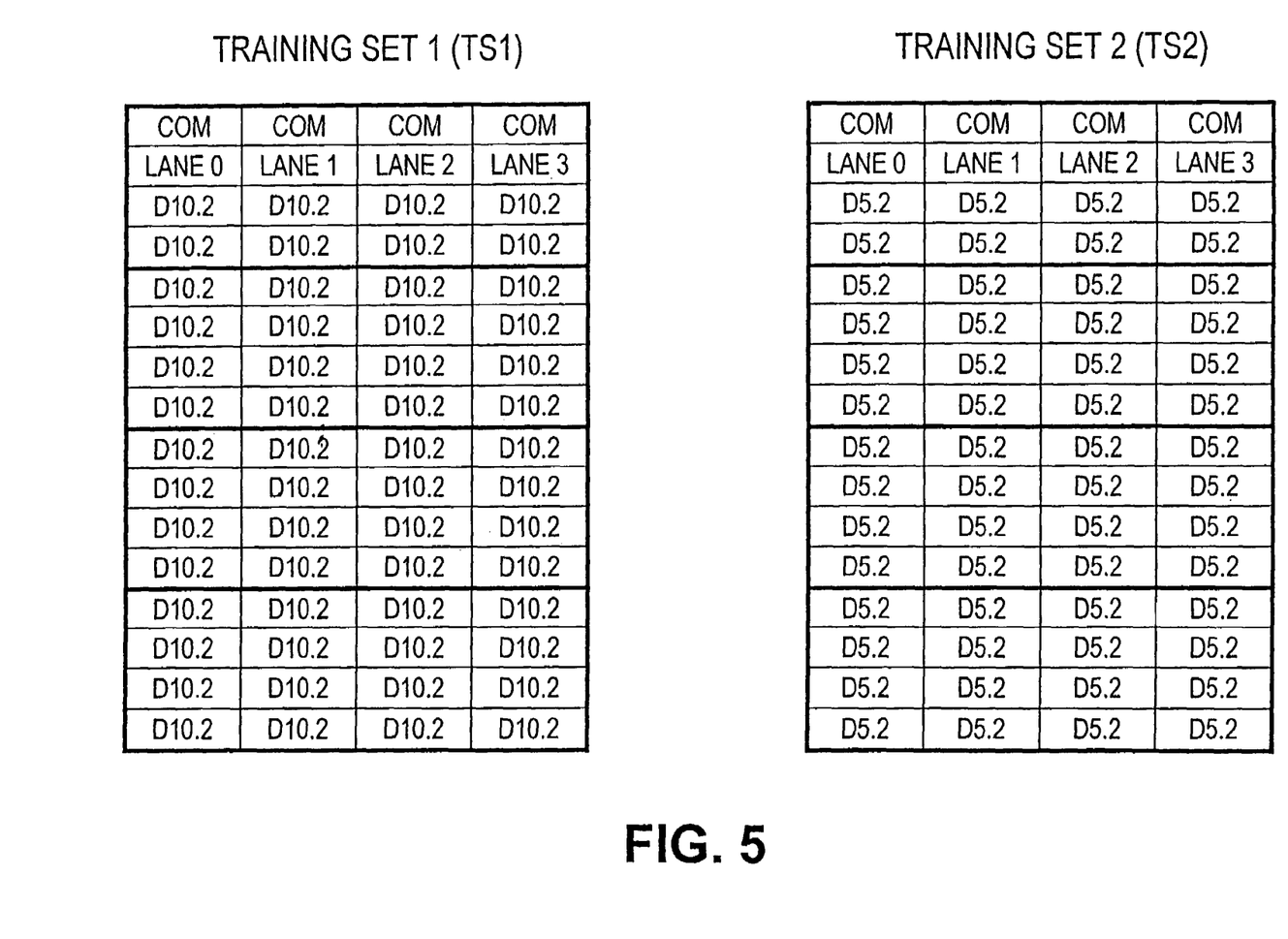
FIG. 5 shows a table of the preferred training packets used to train ports that are coupled to opposite ends of a serial physical link.

FIG. 5 shows the actual format and content of the training sets TS1 and TS2. In the preferred embodiment, each training set is 16 words long. It should be appreciated however, that training sets of different lengths are certainly possible. The width of the training set corresponds to the number of physical lanes in a training set. In the preferred embodiment, the training sets are 1, 4, or 12 words wide corresponding to the 1, 4, and 12 lanes in the preferred embodiment of the physical link. Certainly, other combinations of lane quantities are possible, but the width of the training set corresponds to the number of lanes in the physical link. The embodiment shown in FIG. 5 corresponds to a 4 lane link.

Figure 6:
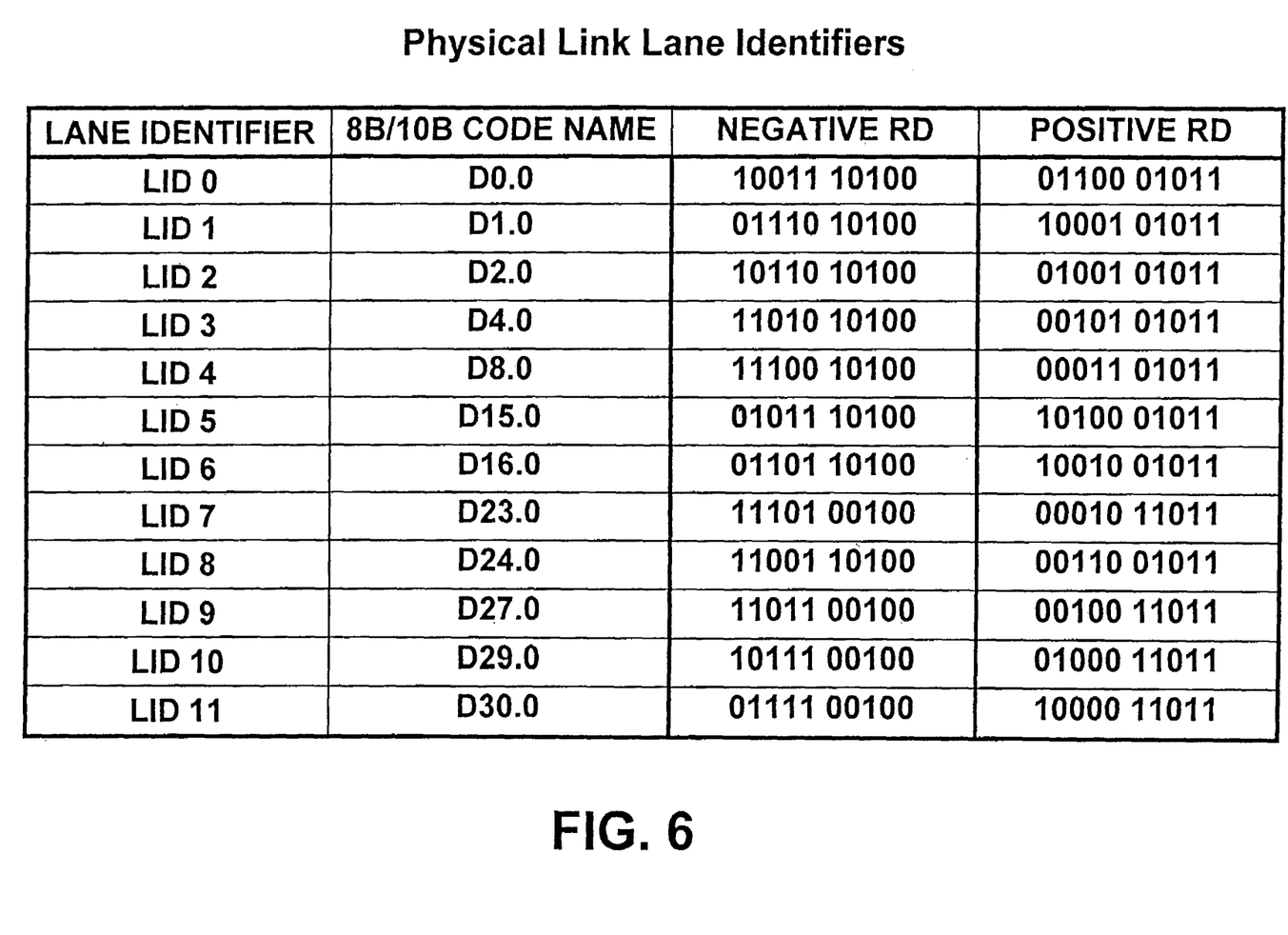
FIG. 6 shows a table of the preferred lane identifiers used to label the individual channels in a serial physical link.

Each word in the training set is a 10-bit word that complies with the 8B/10B code discussed above. The first row (COM) in each column is a comma delimiter, also known as a comma symbol, with a preferred code name K28.5. The second row in each column is a lane identifier that is unique to each lane in the physical link. A table of preferred lane identifiers is shown in FIG. 6. In a single lane link, only lane identifier 0 is used. In a 4 lane link, lane identifiers 0, 1, 2, and 3 are used. In a 12 lane link, all twelve lane identifiers shown in FIG. 6 are used. After the lane identifier, the remaining 14 rows of the 16 row training sets are repeated 10-bit words. For training set 1, the repeated word name is D10.2. For training set 2, the repeated word name is D5.2.

The comma delimiter and lane identifiers are chosen to be insensitive to data inversion. That is, inverting a comma delimiter or a lane identifier symbol changes only the running disparity and not the symbol itself. Consider the 10-bit word for the comma delimiter K28.5. For a negative running disparity, the word is 001111 1010. For a positive running disparity, the word is 110000 0101. These two words are complements of each other. Inverting all the bits in the first word will yield the second word and vice-versa. Hence, regardless of whether or not a bit inversion has occurred in the physical link, when the receiver port decodes this word, the comma delimiter will result. The same is also true for each of the lane identifiers in FIG. 6. For each lane identifier, the 10-bit words for negative running disparity are the complement of the 10-bit word for positive running disparity. Thus, a receiver will always know when a comma delimiter has arrived and which lane identifier corresponds to a given bit stream. The preferred code names selected for the comma delimiter and the lane identifiers were selected because of their inversion properties. Other code words exhibiting the same properties will also work in alternative embodiments.

For training set 1, the preferred 10-bit code name is D10.2 and the bit sequence for positive running disparity is 010101 0101. The D10.2 code word is chosen for the training set because it uses the exact same code word for negative running disparity as it does for positive running disparity. Thus, the receiver expects to receive the 010101 0101 sequence repeated 14 times for each training set 1 packet regardless of the current state of the running disparity. The same conditions hold true for training set number 2. For training set 2, the preferred 10-bit code name is D5.2 and the bit sequence for both positive and negative running disparity is 101001 0101. However, if the sequences are inverted, they decode to different words. The preferred code names selected for training set 1 and training set 2 were selected because of their inversion and running disparity properties. Other code words exhibiting the same properties will also work in alternative embodiments.

Figure 7:
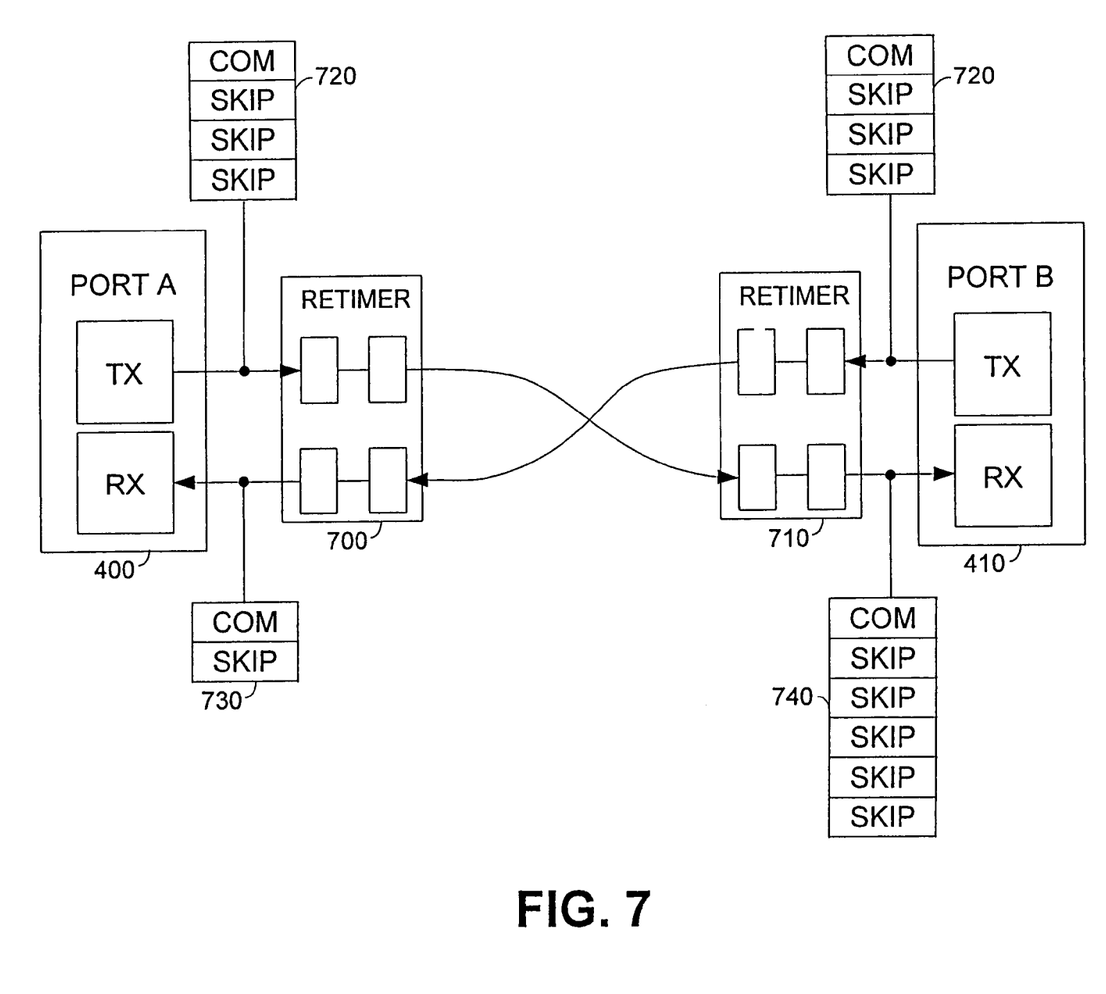
FIG. 7 shows a functional block diagram of a serial physical link.

FIG. 7 shows a block diagram of a preferred embodiment of a serial physical link. Included in the link are Port A 400 and Port B 410 as discussed above. The link shown in FIG. 7 is a 2-lane link with one lane configured to transmit in one direction and the other lane configured to transmit in the opposite direction. Included in the link are retimers 700, 710 located at opposite ends of the link. Retimers 700, 710 provide a means of compensating for minor clock tolerances that result in different clock rates between Port A 400 and Port B 410. To compensate for these clock differences, a data packet called a SKIP ordered set 720 is transmitted at regular intervals amidst the training, data, or idle data packets. In the preferred embodiment, the SKIP ordered sets 720 are inserted every 4608 symbol clocks and include a COM delimiter followed by three SKIP words. As with the training sets, the SKIP ordered sets 720 are as wide as the number of lanes in the link. In FIG. 7, the link contains only one lane, so the SKIP ordered sets 720, contain only one column of 10-bit words.

If a delay is needed to compensate for advanced clock timing, the retimers 700, 710 may insert an additional SKIP word to delay the arrival of subsequent data at the receiving end of the link. This scenario is depicted by the SKIP ordered set 740 shown at the receiver of Port B 410. SKIP ordered set 740 includes two additional SKIP words that have been added by retimer 700 and retimer 710. Consequently, a SKIP ordered set that started with three SKIP words now has a total of five SKIP words. Conversely, if an advance is needed to compensate for delayed clock timing, the retimers 700, 710 may remove an existing SKIP word to advance the arrival of subsequent data at the receiving end of the link. SKIP ordered set 730 shows an example of this scenario. SKIP ordered set 730 contains only one SKIP word as a result of the removal of one SKIP word each by retimer 700 and retimer 710. By compensating for clock tolerances, the link and the Ports on either end of the link can operate in a common clock domain.

In the preferred embodiment, the SKIP word name is K28.0 and the associated 10-bit word is 001111 01000 for negative running disparity and 110000 1011 for positive running disparity. As is the case with the COM and lane identifier words, the SKIP word is insensitive to bit inversion. Other code words exhibiting the same property will also work in alternative embodiments.

Figure 8:
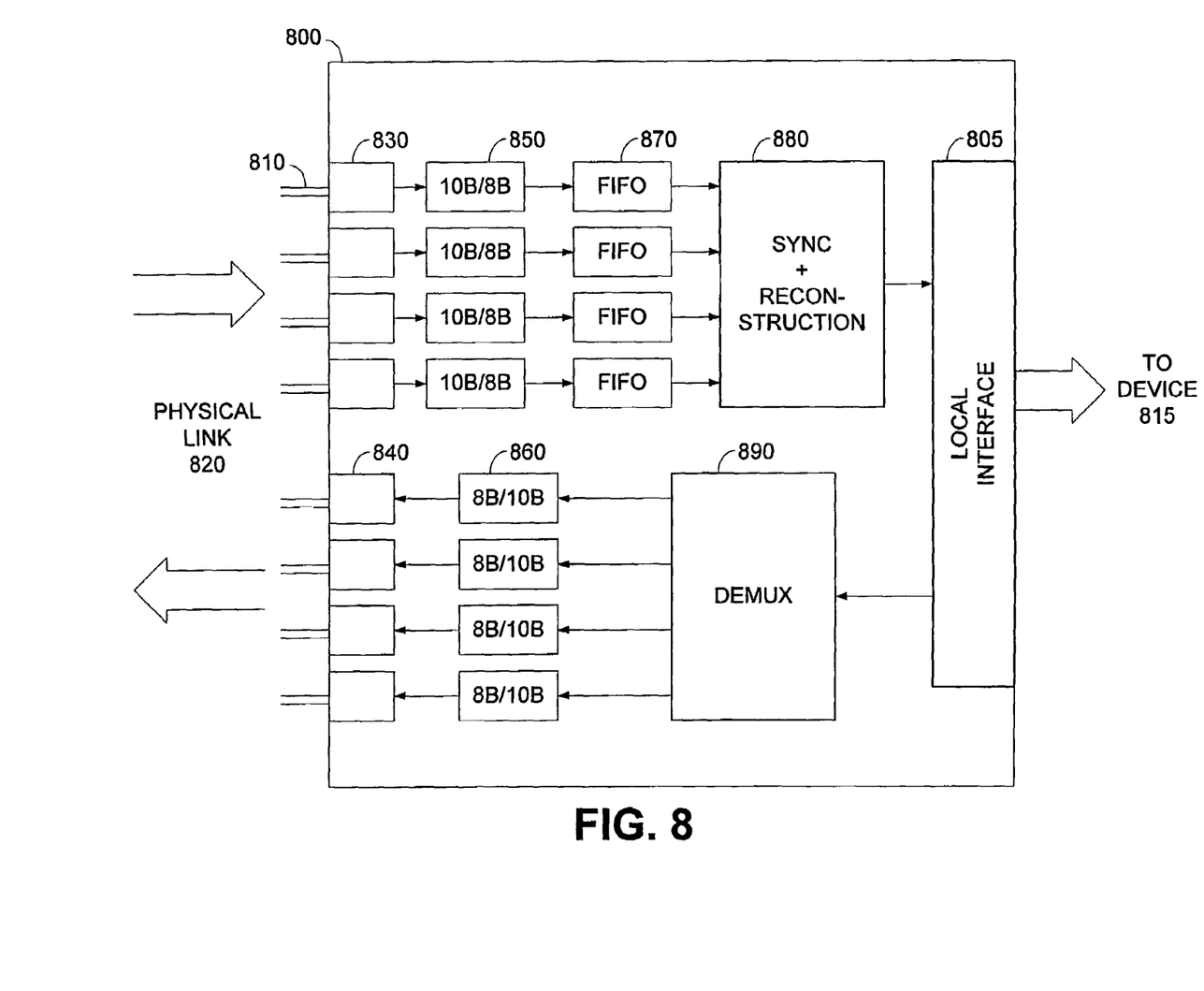
FIG. 8 shows a functional block diagram of an adapter configured to transmit and receive differential signals.

FIG. 8 shows a block diagram of an adapter 800 configured to convert signals transmitted to and received from a physical link 820. The adapter may be coupled to or otherwise form a part of a port and/or a channel adapter. The adapter 800 is coupled to differential wires or traces 810 in the physical link. Differential signals received from the physical link 820 are detected by a lane receiver 830 that converts the differential signals to a bit stream that is sent to a 10B/8B decoder 850. The decoder converts the 10 bit words received from the individual lanes into 8 bit words that are directed to the FIFO buffers 870. In an alternative embodiment, the FIFO buffers 870 may precede the 10B/8B decoders. After the 10B/8B decoders and FIFO buffers, the 8-bit words are synchronously clocked into a multiplexer or other suitable logic device 880 to reconstruct a single byte stream from the individual byte streams. The byte stream is then sent to a local interface 805 for transmission to the local device 815.

The adapter 800 may also convert signals for transmission to a physical link 820. A byte stream from a local device 815 is detected and transmitted to a demultiplexer 890 that stripes bytes from the single byte stream across a number of individual byte streams. FIG. 8 depicts four lanes in the physical link, but this quantity may be different and may depend on whether the link is coupled to a single channel adapter. The individual byte streams are then coded by the 8B/10B encoders and the resulting bit streams are delivered to lane adapters 840 which convert the bit streams to differential signals for transmission across wire pairs or traces 810 in the physical link 820.

Figure 9:
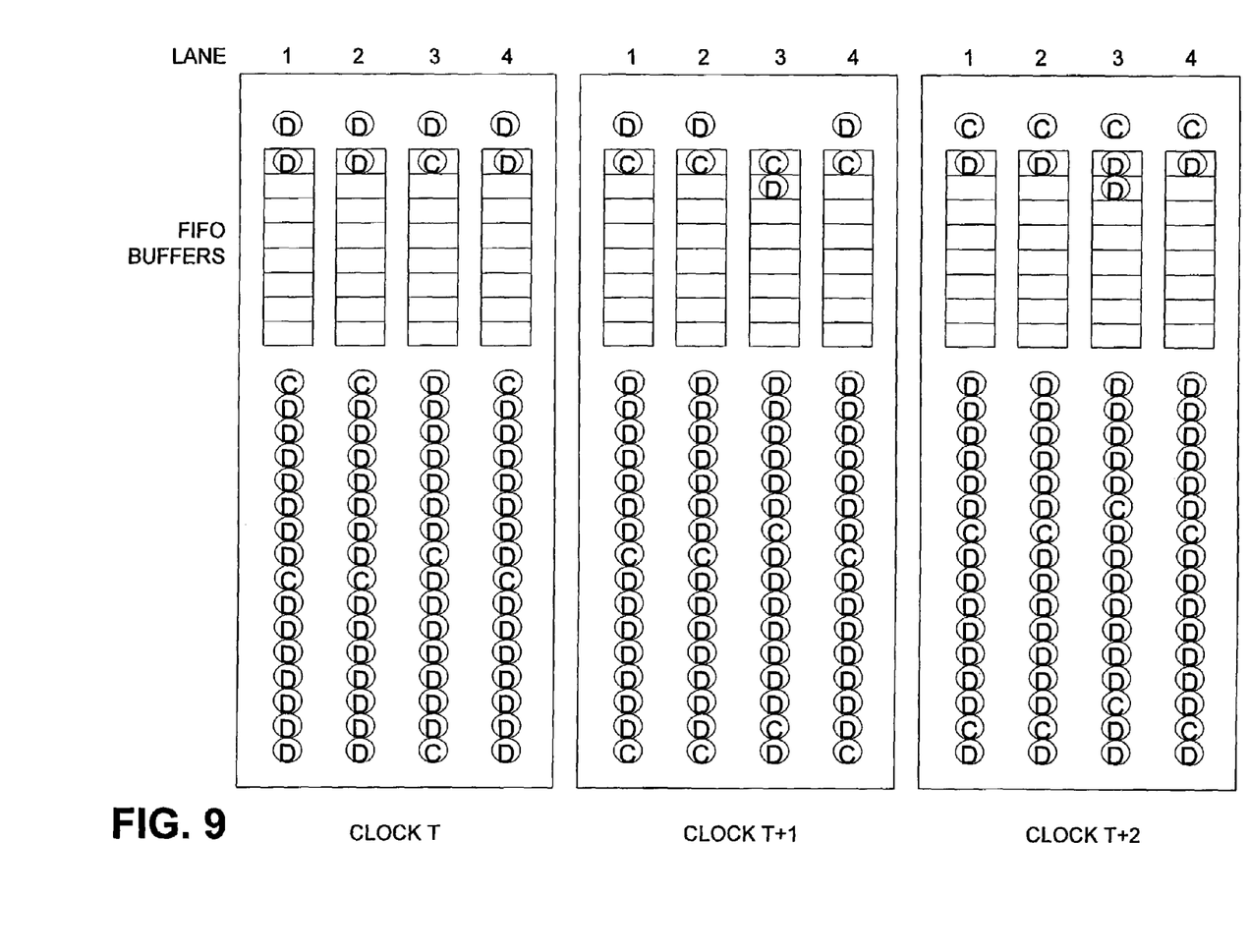
FIG. 9 shows a symbolic representation of the preferred de-skew method.

FIG. 9 shows a symbolic representation of the preferred de-skew method using a bank of synchronous first-in, first-out (FIFO) register buffers. Logic in the port receivers search the data stream for the 8B/10B COM delimiter which signifies the start of a training set. When a comma is found in any stream, that stream is held in a FIFO buffer pending appearance of commas in the other data streams. When commas are present on all lanes, the link is de-skewed and the comma symbol group may then be discarded. When data symbols are present on all lanes, the words form a valid data symbol group and reconstruction of the original word stream is possible. It should be noted that the preferred embodiment implements an 8B/10B coding scheme, but other symbol representations and other word lengths are possible for transmission and reconstruction of the original byte stream.

Referring to FIG. 9, the individual blocks depict the contents of a 4 lane link at various clock times during a training sequence. Hence, each lane of the link contains training set data consisting of a COM delimiter followed by repeated D10.2 or D5.2 words. For clarity, the words have been depicted as individual balloons marked with a C for COM and D for a D10.2 or D5.2 word. Also for clarity, the length of the training set has been shortened from the preferred length of 16 to 8. One word at a time is read into the FIFO buffers at the top of the block. The buffers may or may not shift out a word depending on the contents of the uppermost location in the buffer.

The leftmost block of FIG. 9 represents the contents of the four FIFO buffers and the four lanes at a clock time T. In this example, FIFO number 3 has a COM delimiter in the uppermost location of the buffer. In accordance with the description above, at the next clock time, FIFO number 3 will keep this word in the upper buffer and read a new word from lane 3 into the buffer. Since the other FIFOs do not contain a COM word, the contents of those buffers will be discarded at the next clock time.

The center block of FIG. 9 represents the contents of the buffers and lanes at clock time T+1. All four buffers read in a new word from their respective lanes and once again, the associated logic checks for COM words. In this particular example, all four FIFOs now have COM words located in the uppermost buffer location. As a result, all lanes have been de-skewed and at the next clock time, the COM words can be discarded.

The rightmost block of FIG. 9 represents the contents of the buffers and lanes at clock time T+2. The COM words have been shifted out of the buffers and all subsequent words will be synchronized. Note that FIFO number 3 still holds two words in the buffer. This ensures the continuous arrival of de-skewed data and facilitates the reconstruction of the original word stream.

The preferred embodiment discussed above uses a bank of synchronous FIFO register buffers, but other embodiments may work. For instance, the buffers and related logic may be implemented using a field-programmable gate array (FPGA) or any other suitable programmable logic device (PLD).

To prevent buffer overflow, a time limit is implemented on attempting to locate COM words across each lane of the link. In the preferred embodiment, a time limit of 4 clock times is used. This time limit corresponds to one fourth of the length of the training set. If COM words cannot be found across all lanes of the link within four clock times, the buffers are cleared and the de-skew process is restarted. By limiting the time required to de-skew the multiple lanes, the size of the FIFOs may be reduced and the logic required to implement the de-skew is simplified.

In addition to correcting static skew errors as discussed above, the synchronous FIFOs may advantageously provide an additional measure of correction for active skew errors such as jitter and drift. The receiver in each channel in the link is frequency and phase locked to the transmitter, but the active components in the physical link responsible for serial/parallel conversion and the retimers 700, 710 shown in FIG. 7 may induce drift and jitter and other dynamic skew. The common clock in the FIFOs may advantageously recover synchronization of each individual channel.

The above discussion is meant to be illustrative of the principles and various embodiments of the present invention. Numerous variations and modifications will become apparent to those skilled in the art once the above disclosure is fully appreciated. For example, a physical link with the above properties and characteristics may be constructed with eight or sixteen lanes per link and still operate within the scope of this description. It is intended that the following claims be interpreted to embrace all such variations and modifications.

What is claimed is:

1. A high-speed interconnection adapter that comprises:
   a first-in-first-out (FIFO) buffer for each of a plurality of channels; and
   a reconstruction logic coupled to the FIFO buffers and configured to monitor output symbols in the FIFO buffers during a training sequence for start symbols, wherein upon detection of a start symbol from less than all the FIFO buffers the reconstruction logic is configured to suspend output from the FIFO buffers in which start symbols were detected during the training sequence; discard symbols from the FIFO buffer for each of a plurality of channels where the start symbols are not detected; and wherein the suspension of output from the FIFO buffers and discarding symbols from the FIFO buffer for each of a plurality of channels continues until the start symbols are detected in all the FIFO buffers.

2. The adapter of claim 1, wherein once start symbols are detected in all FIFO buffers the reconstruction logic is configured to retrieve symbol groups in sequence from the FIFO buffers, each symbol group consisting of one symbol from each FIFO buffer.

3. The adapter of claim 2, wherein the reconstruction logic is configured to form a symbol sequence by ordering symbols with the symbol groups and concatenating the symbol groups which represent data.

4. The adapter of claim 3, wherein the symbols are eight-bit bytes.

5. The adapter of claim 3, wherein comma symbol groups and skip symbol groups do not represent data.

6. The adapter of claim 1, wherein the start symbol is a comma symbol.

7. The adapter of claim 1, the suspension is limited to less than a predetermined number of symbol periods, and wherein if start symbols are not detected in all FIFO buffers at the end of the predetermined number of symbol periods, the FIFO buffers are cleared and the suspension is lifted.

8. The adapter of claim 1, further comprising:
   a channel decoder for each of the plurality of channels configured to provide symbols to the FIFO buffers, wherein the channels are independent serial channels, and wherein the channel decoder is an 8B/10B code decoder.

9. A method of de-skewing data received via a plurality of channels, wherein the method comprises:
   receiving, during a training period, symbols into a plurality of FIFO buffers that corresponds to a respective plurality of communication channels;
   for each FIFO buffer, removing symbols received during the training period until a start symbol is detected;
   upon detection of one or more start symbols from less than all of the plurality of FIFO buffers, suspending removing symbols received during the training period from the plurality of FIFO buffers in which the start symbol is detected; and
   discarding symbols from the plurality of FIFO buffers where the start symbols are not detected until the start symbol is detected in each FIFO buffer.

10. The method of claim 9, wherein said suspending lasts for a maximum number of symbol periods unless start symbols are detected in all the FIFO buffers.

11. The method of claim 9, further comprising:
   upon detection of start symbols in all of the plurality of FIFO buffers, ending the training period and retrieving actual data symbol groups in sequence from the FIFO buffers, each actual data symbol group consisting of one symbol from each FIFO buffer.

12. The method of claim 11, further comprising:
   combining symbol groups to produce an output symbol sequence.

13. A method comprising:
   training receivers at each end of communication link comprising a first device and a second device coupled by a plurality serial lanes, the training comprising:
   sending a known training start symbol and a plurality of known training data symbols across each serial lane from the first device;
   receiving the known training start symbol and a plurality of known training data symbols in a plurality of buffers, one buffer each for each serial lane, in the second device;
   discarding the plurality of known training data symbols from each buffer until the known training start symbol is reached; thereby
   de-skewing each serial lane; and
   sending actual data between the first device and the second device across the plurality of serial lanes after the training step.

14. The method as defined in claim 13 further comprising, after discarding and de-skewing, receiving a plurality of training data symbols to verify that the serial lanes have been de-skewed.

15. The method as defined in claim 13 wherein discarding the symbols further comprises discarding the symbols only during a training period.

16. The method as defined in claim 15 further comprising clearing the plurality of buffers if discarding the symbols continues for more than a predetermined number of symbols.

* * * * *

UNITED STATES PATENT AND TRADEMARK OFFICE
CERTIFICATE OF CORRECTION

PATENT NO.         : 7,197,100 B2                                          Page 1 of 1
APPLICATION NO.    : 10/680913
DATED              : March 27, 2007
INVENTOR(S)        : William P. Bunton et al.

It is certified that error appears in the above-identified patent and that said Letters Patent is hereby corrected as shown below:

In column 12, line 52, in Claim 13, after "plurality" insert -- of --.

Signed and Sealed this

Ninth Day of September, 2008

JON W. DUDAS
*Director of the United States Patent and Trademark Office*